(12) United States Patent
Brault et al.

(10) Patent No.: US 7,228,657 B2
(45) Date of Patent: *Jun. 12, 2007

(54) CLIMATE CONTROL FOR A GREENHOUSE

(75) Inventors: David Brault, Winnipeg (CA); Alex Turkewitsch, Toronto (CA); Ron Giercke, Winnipeg (CA); Steve Schram, Winnipeg (CA); Wayne Zimmerman, Winnipeg (CA); Yvon Normandin, Saint-Lambert (CA)

(73) Assignee: Controlled Environments Limited, Manitoba (CA)

( * ) Notice: Subject to any disclaimer, the term of this patent is extended or adjusted under 35 U.S.C. 154(b) by 209 days.

This patent is subject to a terminal disclaimer.

(21) Appl. No.: 10/616,298

(22) Filed: Jul. 10, 2003

(65) Prior Publication Data

US 2005/0005510 A1    Jan. 13, 2005

(51) Int. Cl.
*A01G 9/14* (2006.01)

(52) U.S. Cl. .............................. 47/17; 47/18; 454/236; 454/239; 454/256

(58) Field of Classification Search .................. 47/17, 47/18; 454/233, 236, 239, 251, 256
See application file for complete search history.

(56) References Cited

U.S. PATENT DOCUMENTS 1,817,384 A * 8/1931 Lewis et al. ................. 454/236
4,531,454 A * 7/1985 Spoormaker ................. 454/232
5,279,609 A * 1/1994 Meckler ..................... 236/49.3

FOREIGN PATENT DOCUMENTS

| JP | 04016131 A | * | 1/1992 |
| JP | 10052175 A | * | 2/1998 |
| JP | 2000069858 A | * | 3/2000 |
| JP | 2003219736 A | * | 8/2003 |

OTHER PUBLICATIONS

Both. 2003. Introduction Into Greenhouse Environmental Control. Horticultural Engineering vol. 18. at http://aesop.rutgers.edu.*

* cited by examiner

*Primary Examiner*—Jeffrey L. Gellner
(74) *Attorney, Agent, or Firm*—Adrian D. Battison; Michael R. Williams; Ryan W. Dupuis

(57) ABSTRACT

A greenhouse has an exterior curtain wall structure formed by spaced tubular posts carrying external transparent panels and bottom non-transparent wall panels below a sill with the panels spanning the posts. A plurality of elongate benches is located within the interior at spaced positions along one side wall with the width of the benches being equal to the post spacing to form an expandable construction. Each bench has associated with it a respective air handling system for conditioning including a duct which is located partly under the respective bench and a fan in a fan housing at the side wall. From the fan a vertical duct section extends to a flexible tube extending over the bench. Air dehumidification, fogging, heating and cooling are provided in the duct under the bench. An alley is arranged along the opposite wall containing electrical controls mounted in cabinets forming panels for mounting in the span between posts.

37 Claims, 11 Drawing Sheets

CLIMATE CONTROL FOR A GREENHOUSE

This invention relates to a climate control system for a greenhouse.

The term greenhouse as used herein is intended to be primarily but not exclusively directed to environmentally controlled growth chambers using primarily natural light and thus having transparent walls, and particularly to such structures having uniform and accurate control of the interior environment. Such structures are primarily intended for use in research or other similar environments where uniform and accurate control is of high importance rather than in crop production facilities where such close control of the environment cannot be economically justified. However the present invention is not intended to be limited to any particular type or use of such a facility.

This application is related to a series of two further applications all filed simultaneously with this application and assigned to the same assignee as follows:

Application Ser. No. 10/619,297 filed Jul. 10, 2003 and entitled Structure of a Greenhouse;

Application Ser. No. 10/616,296 filed Jul. 10, 2003 and entitled Climate Control for a Greenhouse;

The disclosures of the above applications are incorporated herein by reference.

BACKGROUND OF THE INVENTION

Greenhouses used for research and high value production often include complex and expensive climate control systems for controlling air quality including temperature control by heating and cooling as required, and humidity, by de-humidification and humidification as required. Also such greenhouses are generally designed so as to maximize light availability to the growing plants. Such greenhouses therefore may include shades and lighting systems so as to control the light availability.

Up until now such greenhouses have generally been manufactured in the same manner as commercial buildings in that different contractors and suppliers are contracted to assembly the exterior structure, to provide air handling equipment, to provide electrical control systems, to provide shading systems and to provide lighting systems.

Thus the exterior structure is initially constructed using available constructions systems to provide a primarily transparent exterior structure. However the benches for supporting the plants, the air handling system and the remaining components are not necessarily manufactured so as to best fit within the exterior structure. Thus additional design effort is necessary to design and construct each of the separate components to match the structure of the exterior.

The arrangement disclosed hereinafter is designed based upon the concept that the greenhouse be supplied as a complete structure in which the necessary components are arranged and designed each in relation to the others so as to provide an assembly which is expandable in nature and in which each component is best suited to match the structure and arrangement of the remaining components.

SUMMARY OF THE INVENTION

It is one object of the present invention, therefore, to provide an improved climate control system for a greenhouse.

According to a first aspect of the invention there is provided a climate control system for use in a greenhouse having an exterior wall structure which includes primarily transparent panels allowing entry to an interior of natural light, the system being arranged for conditioning the air within the interior and comprising:

a bench arranged to be located within the interior and provide support surfaces for supporting crop materials thereon for receiving the natural light and growing within the interior;

an air handling system comprising:

an air intake plenum having at least one air intake, a fan connected to the plenum, an outlet duct connected to the fan having an air outlet for expelling air from the duct into the interior of the greenhouse, and at least one air conditioning component for conditioning the air transported from the plenum to the duct by the fan;

the plenum including at least a part thereof mounted underneath the bench and forming at least a part of a support for the bench.

The term conditioning used herein is not limited to cooling air but is merely intended to be directed to any form of changing the characteristics of the air. Such as by heating, cooling, de-humidifying or by humidifying, which can be carried out by many different processes.

Preferably there is provided a plurality of benches wherein each bench has associated therewith a respective plenum and a respective fan and wherein at least a part of the plenum associated therewith is mounted underneath the bench and forming at least a part of a support for the bench.

Preferably the part of the plenum under the bench defines a rectangular housing arranged for supporting a horizontal bench top.

Preferably the horizontal bench top is slidable side to side across the housing.

Preferably the horizontal bench top is tiltable about a horizontal axis longitudinally along the housing Preferably the duct includes a vertical duct section at one end of the bench.

Preferably the duct includes a horizontal discharge duct section connected to the vertical duct section and extending over the bench for discharging the air therefrom downwardly onto the bench.

Preferably the horizontal duct section comprises a flexible tube shaped to form an elliptical cross section which is wider than it is high.

Preferably the plenum underneath the bench contains at least one heating coil for heating the air.

Preferably the plenum underneath the bench contains at least one cooling coil for cooling the air.

Preferably the plenum underneath the bench includes at least two inlets and wherein there is provided a cooling coil at each of the inlets.

Preferably supply of cooling fluid to each of the coils is controlled by a cooling system which is arranged to effect sub-cooling at one of the coils for de-humidifying the air.

Preferably the fan is located in a fan housing at one end of the bench.

Preferably there is provided an air flow connection which is arranged to communicate with one sidewall of the exterior wall structure at one end of the bench.

Preferably the plenum underneath the bench has two inlets one at each side and one at an end.

Preferably the plenum underneath the bench contains fogging nozzles for applying water droplets to the air.

Preferably the fogging nozzles are supplied with water under pressure from a fogging water supply system including a water pump operable to supply water under pressure to an accumulator tank having a gas membrane, the tank being arranged to supply the water under pressure to the nozzles and including a pressure control valve arranged to operate the pump to maintain the pressure within the tank between upper and lower pressure limits so as operate the pump only when the lower pressure limit is reached.

According to a second aspect of the invention there is provided a climate control system for use in a greenhouse having an exterior wall structure which includes primarily transparent panels allowing entry to an interior of natural light, the system being arranged for conditioning the air within the interior and comprising:

a bench arranged to be located within the interior and provide support surfaces for supporting crop materials thereon for receiving the natural light and growing within the interior;

an air handling system comprising:

an air intake plenum having at least one air intake, a fan connected to the plenum, an outlet duct connected to the fan having an air outlet for expelling air from the duct into the interior of the greenhouse, and at least one air conditioning component for conditioning the air transported from the plenum to the duct by the fan;

wherein the plenum includes at least two inlets and wherein there is provided at each of the inlets within the duct a cooling coil for cooling the air;

and wherein the supply of cooling fluid to each of the coils is controlled by a cooling system which is arranged to effect sub-cooling at one of the coils for de-humidifying the air.

According to a third aspect of the invention there is provided a climate control system for use in a greenhouse having an exterior wall structure which includes primarily transparent panels allowing entry to an interior of natural light, the system being arranged for conditioning the air within the interior and comprising:

a bench arranged to be located within the interior and provide support surfaces for supporting crop materials thereon for receiving the natural light and growing within the interior;

an air handling system comprising:

an air intake plenum having at least one air intake, a fan connected to the plenum, an outlet duct connected to the fan having an air outlet for expelling air from the duct into the interior of the greenhouse, and at least one air conditioning component for conditioning the air transported from the plenum to the duct by the fan;

wherein the plenum contains fogging nozzles for applying water droplets to the air;

and wherein the fogging nozzles are supplied with water under pressure from a fogging water supply system including a water pump operable to supply water under pressure to an accumulator tank having a gas membrane, the tank being arranged to supply the water under pressure to the nozzles and including a pressure control valve arranged to operate the pump to maintain the pressure within the tank between upper and lower pressure limits so as operate the pump only when the lower pressure limit is reached.

According to a fourth aspect of the invention there is provided a climate control system for use in a greenhouse having an exterior wall structure which includes primarily transparent panels allowing entry to an interior of natural light, the system being arranged for conditioning the air within the interior and comprising:

a plurality of benches each arranged to be located within the interior and provide support surfaces for supporting crop materials thereon for receiving the natural light and growing within the interior;

a plurality of air handling systems each comprising:

an air intake plenum having at least one air intake, a fan connected to the plenum, an outlet duct connected to the fan having an air outlet for expelling air from the duct into the interior of the greenhouse, and at least one air conditioning component for conditioning the air transported from the plenum to the duct by the fan;

the plurality of air handling systems being equal in number to the plurality of elongate benches such that each bench has associated therewith a respective one of the air handling systems.

According to a fifth aspect of the invention there is provided a climate control system for use in a greenhouse having an exterior wall structure which includes primarily transparent panels allowing entry to an interior of natural light, the system being arranged for conditioning the air within the interior and comprising:

a bench arranged to be located within the interior and provide support surfaces for supporting crop materials thereon for receiving the natural light and growing within the interior;

an air handling system comprising:

an air intake plenum having at least one air intake, a fan connected to the plenum, an outlet duct connected to the fan having an air outlet for expelling air from the duct into the interior of the greenhouse, and at least one air conditioning component for conditioning the air transported from the plenum to the duct by the fan;

wherein the fan is mounted in a fan housing with the fan housing at one end of the bench arranged to be located at one exterior wall of the greenhouse and wherein the fan housing has a connection for exterior air arranged to extend through said one exterior wall.

According to a sixth aspect of the invention there is provided a climate control system for use in a greenhouse having an exterior wall structure which includes primarily transparent panels allowing entry to an interior of natural light, the system being arranged for conditioning the air within the interior and comprising:

a bench arranged to be located within the interior and provide support surfaces for supporting crop materials thereon for receiving the natural light and growing within the interior;

an air handling system comprising:

an air intake plenum having at least one air intake, a fan connected to the plenum, an outlet duct connected to the fan having an air outlet for expelling air from the duct into the interior of the greenhouse, and at least one air conditioning component for conditioning the air transported from the plenum to the duct by the fan;

the plenum including at least a part thereof mounted underneath the bench and the duct including at least a part thereof above the bench for discharge of the conditioned air downwardly onto the bench.

BRIEF DESCRIPTION OF THE DRAWINGS

One embodiment of the invention will now be described in conjunction with the accompanying drawings in which.

DETAILED DESCRIPTION

Figure 1:
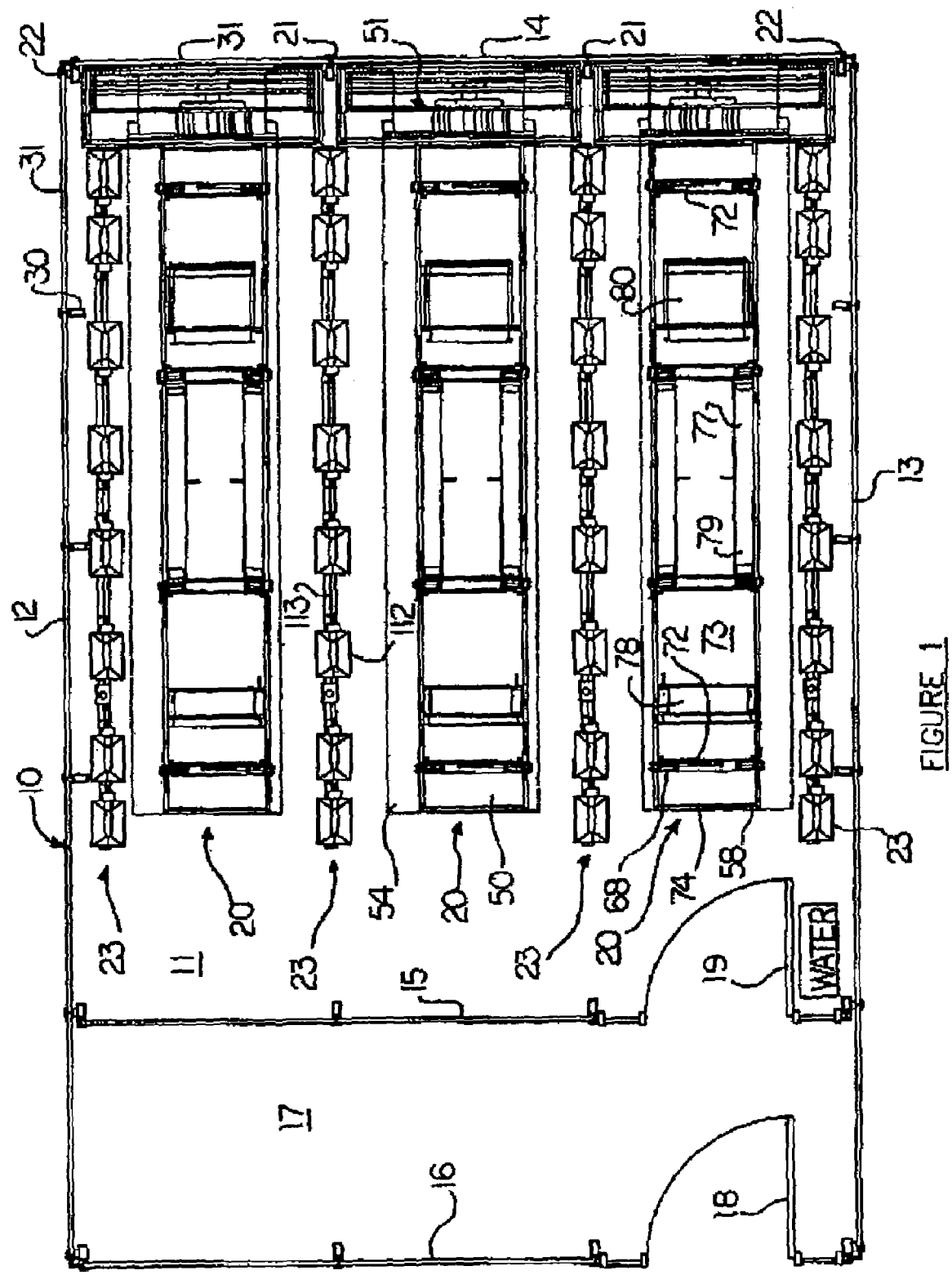
FIG. 1 is a plan view of a green house according to the present invention.
Figure 2:
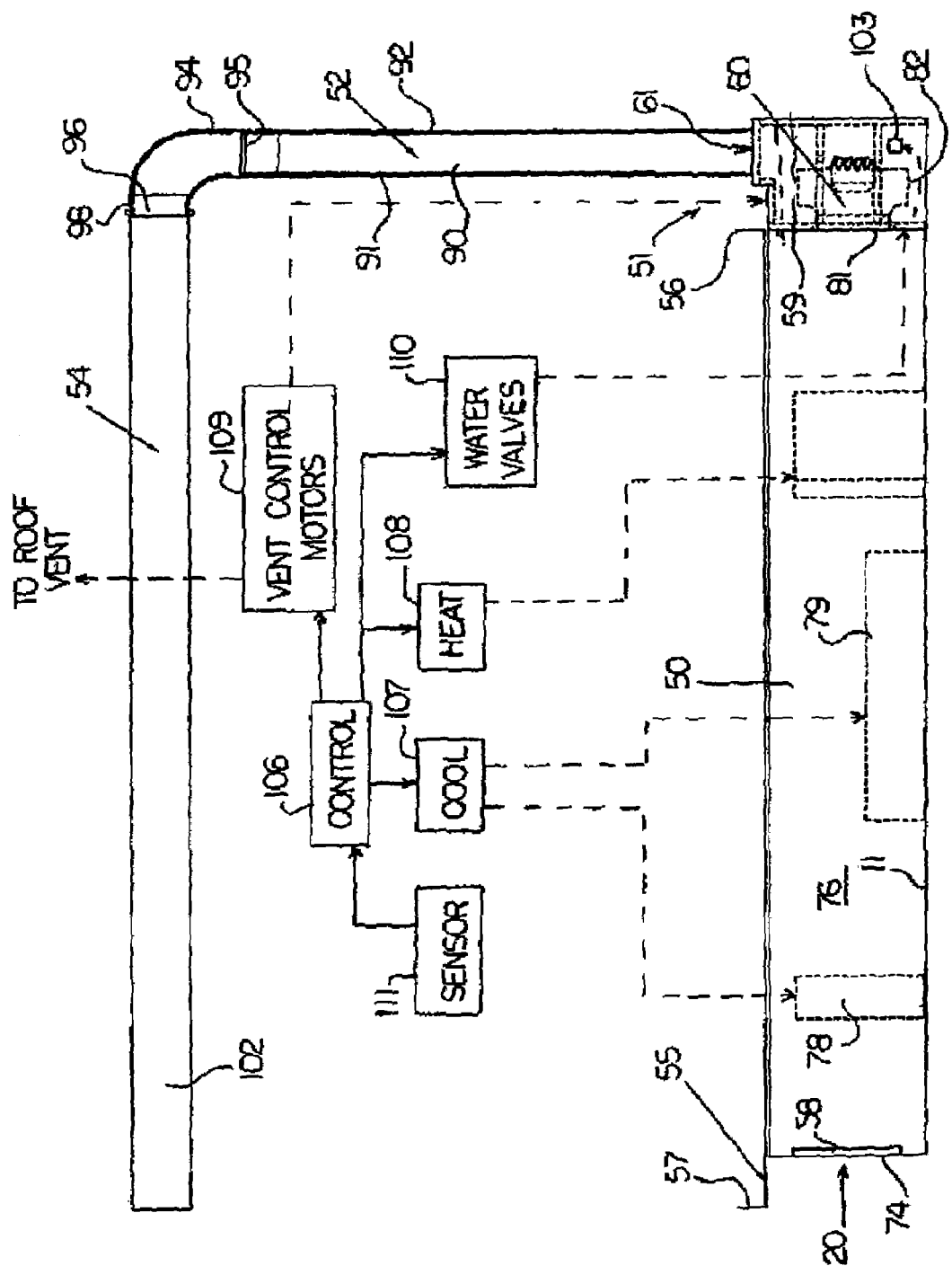
FIG. 2 is a longitudinal cross sectional view through one of the benches of FIG. 1 showing the air handling an conditioning components therein.

A greenhouse structure is shown in FIG. 1 and comprises an exterior wall 10 supported on a suitable concrete foundation 11 and defining side walls 12 and 13 of the greenhouse together with a first end wall 14 and a second end wall 15. Parallel to the end wall 15 is provided an alley wall 16 so that between the parallel walls 15 and 16 is an alleyway 17. A first door 18 allows access into the alley and is provided in wall 16 and a second door 19 is mounted in the wall 15 so as to allow access from the alley into the main interior of the greenhouse.

Within the greenhouse is mounted a plurality of greenhouse benches generally indicated at 20, each of which comprises an air handling system and a bench top support for plants. The greenhouse is manufactured as an expandable system so that the number of benches to be contained within the greenhouse can be increased or decreased in accordance with requirements by selecting a desired length of the greenhouse to accommodate an according respective number of benches. Thus the outside wall structure is formed in sections which can be added and are associated in width with the benches and associated air handling system so that an addition of further wall sections can be complemented by the same number of additional benches.

Thus the wall 14 is formed from posts 21 and corner posts 22. The distance between each of the post is arranged to be equal to the nominal width of a bench so that each bench fits between a post on the next adjacent post and extends from the wall 14 at right angles to that wall in a direction toward the opposite wall 15. It will be appreciated therefore that the addition of further posts thus increasing the length of the wall 14 and of course the corresponding length of the wall 15 allows the addition of further benches of the same width and same structure as those shown in FIG. 1.

Also shown in FIG. 1 is a lighting system comprising four rows 23 of lamps. Each of the rows 23 is aligned with a respective one of the posts so that two of the rows are directly aligned with the posts 21. Of course the rows at the walls 12 and 13 are necessarily moved slightly inwardly from the wall so as to be approximately aligned with the post 22 but move slightly inwardly to be located within the wall structure which is aligned with the respective corner post described in more detail hereinafter.

Turning now to FIGS. 4, 5, 6, and 7, the structure of the greenhouse is shown in more detail. Thus from FIG. 5 it will be noted that the greenhouse includes a roof generally indicated at 24 which includes trusses 27 defined by roof rafters 25 converging to an upper apex 26 and horizontal bottom beams 28 interconnected by suitable reinforcing members 27A. The height of the walls is generally of the order of 14 feet thus defining a generally shallow roof structure as is well known in greenhouse construction. The alleyway 17 between the end wall 15 and the alley wall 16 is formed as an extra structure on the otherwise symmetrical greenhouse construction with the roof line defined by the rafters 25A extending downwardly over the alleyway to terminate at the top of the post forming the wall 16.

Figure 6:
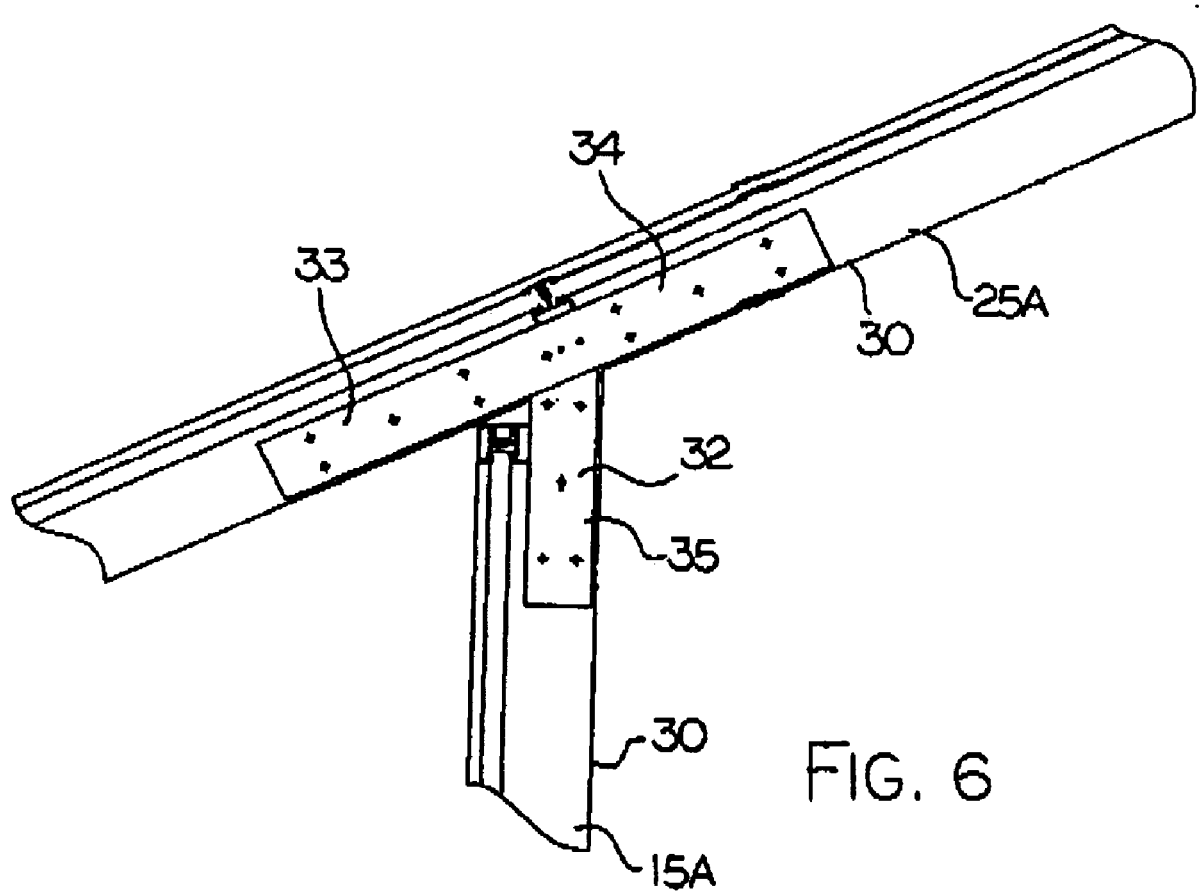
FIG. 6 is a cross sectional view through the junction between a post and roof truss showing the steel interconnections within the interior of the tubular frame members.
Figure 7:
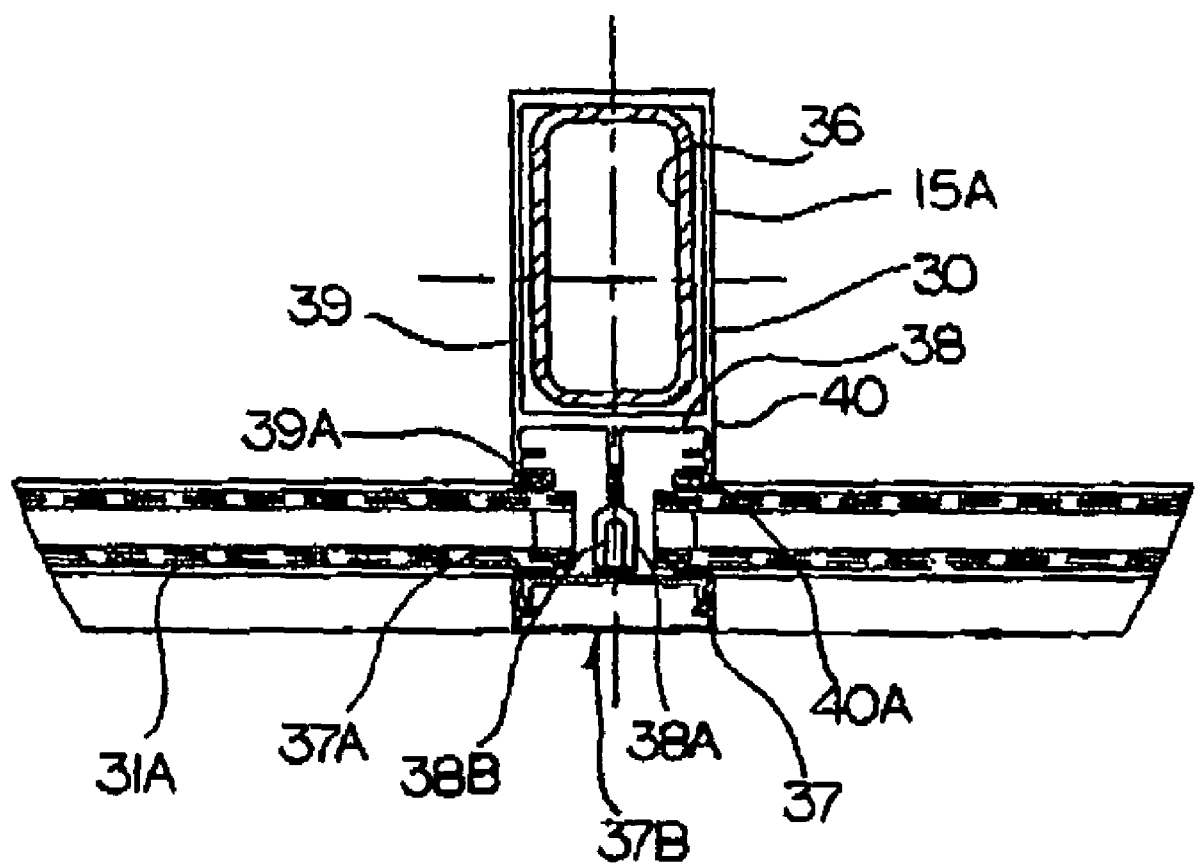
FIG. 7 is a horizontal cross sectional view through a post and its supported panels showing the curtain wall construction.

The walls and roof are formed as a curtain wall structure defined by extruded tubular posts 30 (as shown in FIG. 7) and cladding panels 31. The posts 30 are connected one to the next by steel structural members 32 which have legs arranged to insert into the hollow interior of the tubular members 30 so as to provide a connection of each tubular member to the next and reinforcement of the tubular members at the connections. Thus in FIG. 6 is shown a connection at the top of the post 15 defined by the tubular member 30 which is connected to the roof rafter 25A formed by a further tubular member 30 by the inserted steel reinforcement 32 which has legs 33, 34 and 35 which extend into sections of the tubular members 30 at the junction.

At the bottom of each post of the side walls is formed a mounting bracket 36 which attaches the bottom of the post 15A to the concrete floor as shown in plan in FIG. 7.

The cladding panels 31 are attached to the tubular members 30 by a cap 37. Thus the tubular member 30 defines a main tubular portion of rectangular construction having a front wall 38 and side walls 39 and 40. The side walls 39 and 40 extend beyond the front wall 38 into a receptacle section 40 which defines two butting ends 39A and 40A between which is provided a web section 38A extending outwardly from at right angles to the end wall 38. The end of the web section 38A is formed into a channel 38B which faces outwardly from the tubular member and is projecting between the butting ends 39A and 40A. The cap 37 is formed in two parts including an inner part 37A and an outer end 37B. These two parts clip together. The inner part 37A forms a pair of faces facing toward the end faces 39A and 40A so as to define a channel therebetween for receiving two panels 31 and 31A. Thus the panels are held in place against the tubular member by the end cap. This structure therefore forms a curtain wall in that the system comprises the posts which are spaced by the span of the panels and the panels are held against the posts to cooperate with the posts in forming the structural stability. The inner part of the end cap 37 is held in place against the web 38A by a screw fastener which engages into the channel portion 38B thus holding the cap held fixed against a tubular member.

Curtain wall structures of this type are known and other profiles of the tubular members and associated caps can be provided and are available from other manufacturers.

As shown in FIG. 1, the posts along each of the side walls are formed by the tubular members 30 and the panels 31. At the corners, it will be appreciated that it is necessary to provide an additional tubular member attached to the main tubular member which provides a receptacle for two further panels. Again various arrangements are available for providing a curtain wall structure of this type.

Figure 4:
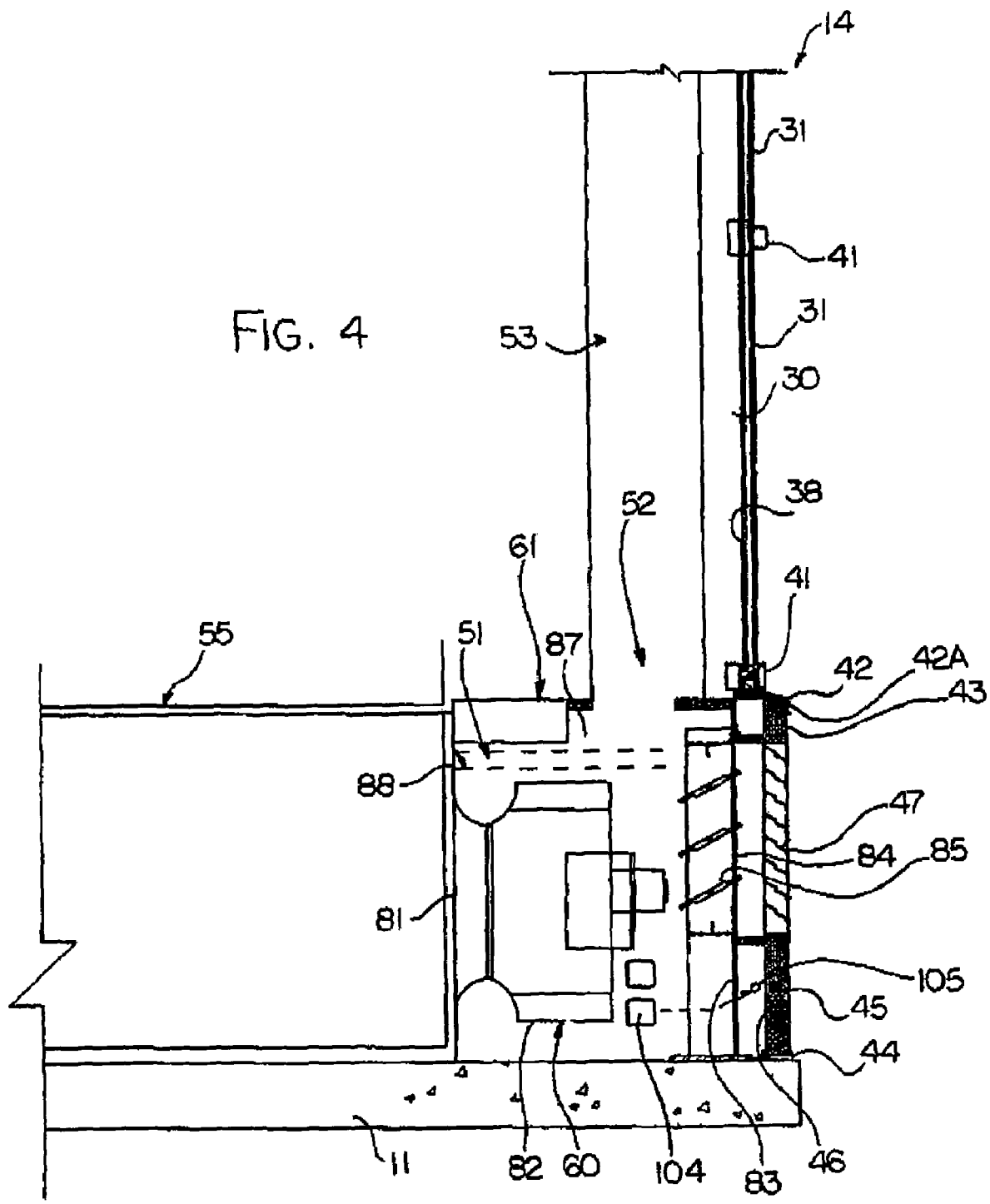
FIG. 4 is a cross sectional view through the fan housing and curtain wall at the end of one of the benches of FIG. 1 showing the location of the fan housing relative to the wall, the inlet and outlet openings to the fan housing from the exterior and the location of the channel or chase within the knee wall construction.

As shown in FIG. 4, the panels 31 are separated by horizontal mullions 41 which extend across between the tubular members 30. Thus the panels 31 are rectangular and span between the posts and are formed of a required height so that a specified number of the panels forms a height of the wall up to the roof structure. The panels are thus separated by the transverse mullion which provide a similar channel and cap arrangement by which the panels are attached to the mullion.

The panels 31 are transparent to allow the passage of exterior light into the greenhouse for providing energy to the plants in a conventional manner. A sill 42 is provided at the height of the benches so that below the height of the benches the walls are formed from insulated opaque panels 43. The sill 42 is attached to the tubular member and extends outwardly to an outermost edge 42A which is spaced outside the wall 38 of the tubular member. The sill thus acts to shed water in a conventional manner from the glass panels so that the water is shed away from the base of the post. The insulated panels 43 extend from the sill to a bottom connector 44 which sits on the concrete base 11. The panels 43 in all of the walls except the end wall 14 are simply solid panels with insulation formed as part of the panel thus defining an outer surface 45 at the outer edge 42A of the sill and inner surface 46 which is located underneath the sill and thus spaced outwardly from the tubular member and spaced outwardly from the end wall 38 thereof, with the web 38A removed in this section. This defines therefore an open channel between the inside surface 46 and the tubular members forming the posts thus forming a channel or chase for the passage of electrical leads, control leads and piping for heating and cooling fluids.

In the end wall 14 as shown in FIG. 4, the panel 43 is perforated to form louvers 47 for communication with the fan housing described hereinafter.

Turning now to FIGS. 1, 2, 3 and 3A, the construction of each of the benches including the associated air handling system of the climate control system. Each of the benches 20 comprises a plenum 50 a fan housing 51, an outlet duct 52 from the fan housing which includes a vertical duct portion 53 and a horizontal duct portion 54. On top of the plenum 50 is mounted a bench tray 55 which extends from a first end 56 at the fan housing 51 to a second end 57 projecting beyond an end 58 of the plenum 50. The plenum 50 also has a second end 59 which provides an intake to the fan housing 51 and particularly to a fan 60 mounted within the fan housing.

Figure 3:
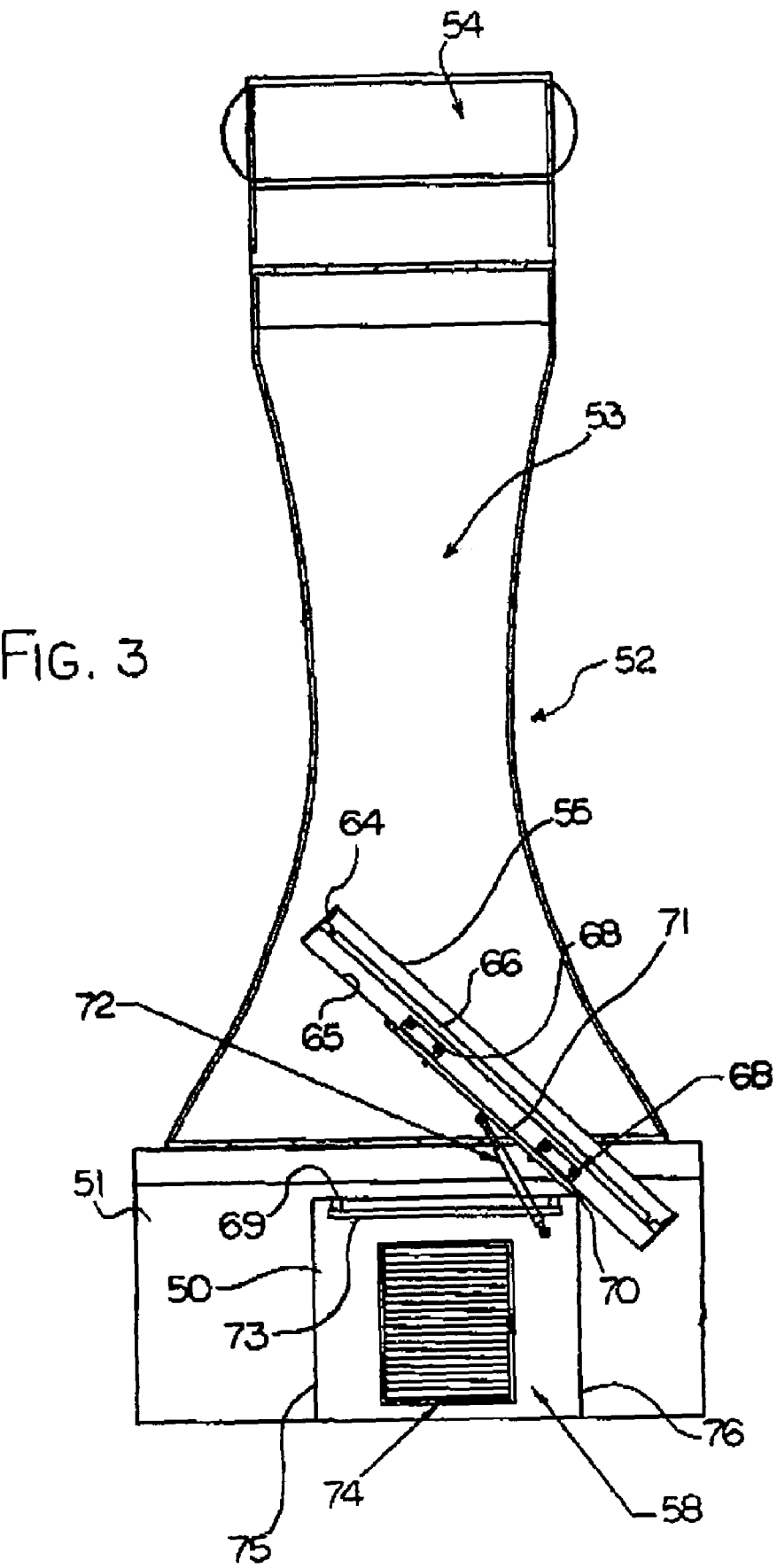
FIG. 3 is a transverse cross sectional view of the one of the benches of FIG. 1 showing the bench sliding and tilting features.
Figure 3A:
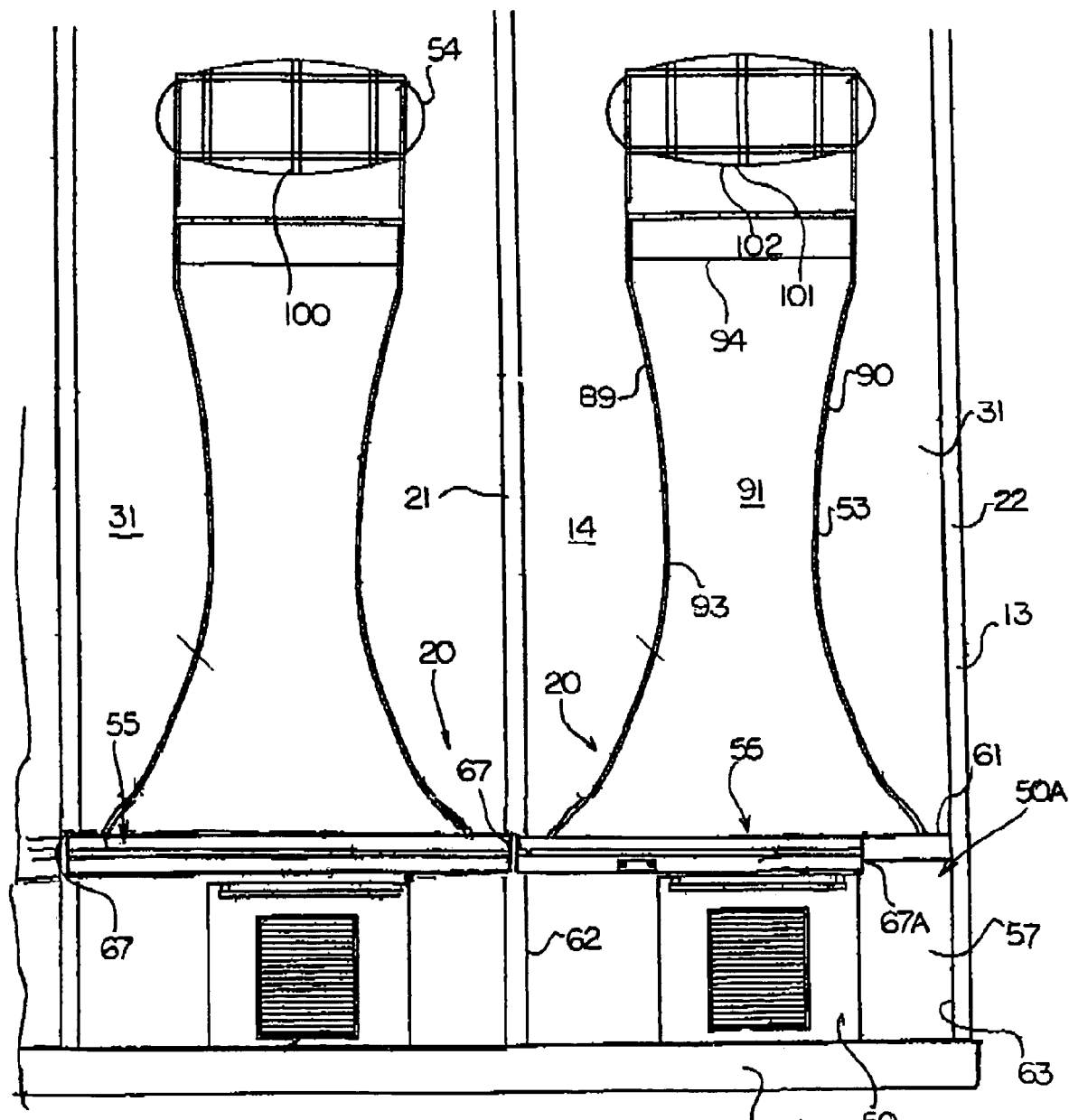
FIG. 3A is a transverse cross sectional view of the a plurality of the benches of FIG. 1 showing the position of the benches relative to one another and to the end wall.

It will be noted from FIGS. 1 and 3A that the fan housing 51 forms a rectangular structure with a base sitting on the concrete floor 11 an upper surface 61 to which the duct portion 53 is attached. The fan housing has sides 62 and 63 which are dimensioned so as to just fit between two of the posts of the end wall 14. Thus an end most one of the benches 20 is located between the corner post 22 and the next adjacent post 21 and a next one of the benches is located between the post 21 and the next adjacent post 21. Thus the width of the benches is equal to substantially the span of the panels 31. The fan housing thus fits between two of the posts and is pushed to a position as far outward between the posts as is possible as best shown in FIG. 1 where the fan housing projects to a position just beneath the height of the sill 42 and located between the posts and extending substantially to the rear or outside surface of the post but leaving the chamber underneath the sill accessible for the communication of piping or wiring as previously described.

The bench trays 55 have an upper surface which is generally at the same height as the top surface 61 of the fan housing and the sill 42 of the framing structure. More particularly, the top surface of the fan housing is underneath the lowers mullion bar at a height of the order of 36 inches. The bench trays are nominally at a height of the order of 32 inches on top of which is received the plants and their containers. This therefore locates the growing plants on the bench tray at the same height as the bottom of the transparent panels 31. Each of the bench trays includes side walls 64 which stand upwardly from a base 65 forming a rectangular container for the plants of a conventional nature. Within the tray is provided a support surface 66 which is formed of a sheet plastics material with ribs and channels for conducting water in a conventional manner well known to one skilled in the art.

Each of the rectangular trays has a length from the end 56 at the fan housing to the end 57 projecting beyond the end wall 58 of the plenum 50. Each of the trays has a width which is nominally equal to the width between the posts 21 so that the side walls 67 of the tray abut the side walls 67 of the next adjacent tray to provide a generally or substantially continuous support surface for the growing plants. The trays of intermediate benches that is benches which are not at the side walls are equal in width to the spacing between the post 21. The end trays have an end wall 67A which is spaced inwardly from the adjacent side wall 12 or 13 to leave an open space into which a user can walk along the open area between the side wall 13 and the side of the plenum 50 as indicated at 50A.

Each of the bench trays is mounted for sliding movement on bearing tracks 68 in a transverse side to side direction relative to the plenum 50. It will be appreciated therefore that the space which is defined for the user to enter into the position alongside the bench can be moved to the other side of the bench by sliding the bench tray horizontally toward the side wall 13. That space can then be moved to the other side of the intermediate bench by sliding the bench tray of the intermediate bench again toward the side wall 14. Thus in an extended greenhouse having many of the benches side by side, all of the benches except one end one or except two end ones of the benches can extend the full width between the posts and the user can get to the side of any one of the benches simply by sliding the benches to the required position to move the space to the required position allowing the user to walk between two of the benches to access the bench on each side of the space. The amount of space necessary is generally of the order of twenty inches thus requiring a sliding movement of each bench of the order of twenty inches and requiring two, generally the endmost ones, of the benches to have a reduced width of ten inches.

The spacing between the posts is equal to the width of the bench and particularly the width of the bench trays as it is selected to be a distance of the order of six feet (or the metric equivalent of two meters) since this provides a bench tray which can be reached from either side with the user being able to reach across the center line of the tray from one side and across the center line of the tray from the other side allowing access to the full area defined by the tray. This width of six feet (two meters) is matched to the spacing between the posts so as to provide a structure in which the greenhouse can be manufactured to accommodate different number of benches simply by adding an additional bay defined by one post and a series of panels and by adding another of the benches which is located between the posts in that bay. The structure further allows the fan housing to be directly associated with the space between the two posts so that it can co-operate with the side wall of the panel below the sill as previously described. Each bench tray is associated with its own air handling system of the climate control system so that air is properly distributed to the plants on the bench so that again the system is expandable in that adding a further bay provides the addition of one further bench and one further air handling system thus avoiding individual design requirements for greenhouse structures as used in conventional practice. The system therefore allows a purchaser to select a greenhouse size and to know that all of the design work is carried out so that the climate control will match the size of the greenhouse and the size of the benches all of which are symmetrical and operate to provide the best climate control which is uniform at the plant height.

The length of the benches, in the embodiment shown, is of the order of eighteen feet so that a construction of four spans of the curtain wall along the side walls provides an alley at the end of the benches which is of the order of four feet. However these lengths are merely examples and can be greater or less as required.

The air handling system of the bench includes the plenum 50, the fan 60 and the duct 52. The plenum 50 comprises a rectangular housing standing on the concrete floor 11 and defining a top surface 69 on which the bench tray 55 sits. The bench tray Is mounted for pivotal movement about a hinge 70 at one corner of the housing forming the plenum as best shown in FIG. 3. The bench tray includes a support member 71 which is pivotally connected at the hinge 70 and can fold downwardly to a closed position sitting on the top surface 69. In the position shown in FIG. 3, the support member 71 is pivoted in a clockwise direction by manual lifting of the bench tray 55 while controlled and assisted by an air cylinder 72. Others of the benches may pivot in the same or opposite directions as required. The slide bearings 68 are connected between the tray 55 itself and a support member 71 so that the tray slides back and forth on the bearings relative to the support member, when the support member is in the lowered position. An interlock (not shown) is provided to prevent sliding movement when the support member is unlocked for lifting so as to prevent uncontrolled sliding movement when the tray is moved to the open position shown in FIG. 3.

In the open position access to the open top surface 69 is provided which allows the user to reach into a closing door 73 which acts as a seal for the top of the plenum to prevent air entry into the plenum except at the desired inlet locations described hereinafter. When the bench tray is pivoted to the inclined open position shown in FIG. 3, therefore, the doors 73 can be accessed for opening to allow service work and cleaning within the plenum. The air plenum into which air enters is therefore defined by the door 73 and the sides of the rectangular housing defining the plenum.

The end wall 58 of the plenum includes an inlet 74 which is covered by a grill to allow the entry of air into the plenum at the end wall for movement along the plenum to the fan 60 under suction generated by the fan. The side walls 75 and 76 of the plenum each have an air inlet 77 which is located at the floor 11 and extending along the side of the plenum. The air intake 77 are relatively low forming less than one half of the height of the plenum so as to take air primarily from the floor level.

Inside each of the inlets 74 and 77 is provided a cooling coil 78 and 79 respectively. The cooling coil is thus located across the plenum so that air drawn into the respective inlet passes through the cooling coil. When supplied with cooling fluid, the cooling coil acts to reduce the temperature of the air drawn into the plenum. Downstream of the three inlets 74 and 77 is provided a heating coil 80 which is located between the inlets 77 and the fan 60. When supplied with heating fluid, the heating coil will act to apply heat to the air drawn into the fan. Thus by selecting the requisite level of heating and cooling fluid, the temperature of the air at the fan can be selected in accordance with requirements so that the air supplied to the plants on the bench trays is at the required temperature.

The fan 60 is mounted in the fan housing which is arranged to butt the end wall 59 of the plenum. The fan is of the centrifugal type defining a circular air inlet 81 and an annular air outlet 82 which ejects the air into the rectangular fan housing surrounding the annular outlet 82. As previously described the fan housing 51 communicates with an outlet 47 in the panel 43. The fan housing 51 has a rear wall 83 at the panel 43 which has an opening 84 controlled by flaps 85 which can be moved from a closed position preventing the escape of air from the fan housing through the opening 47 to a controlled open position which allows a controlled amount of air to escape from the fan housing to the exterior through the opening 47. The opening 84 thus acts as an air outlet for expelling air from the interior of the greenhouse pulled into the plenum through the inlets to the plenum. Makeup air into the greenhouse can be drawn through roof vents 86 shown in FIG. 5. These roof vents comprise panels along the roof ridge 26 which are hinged at the roof ridge and can be pivoted upwardly away from the roof line to provide an opening on the underside of the roof vent. The climate control system can therefore be controlled to manage the temperature within the green house by drawing air along the paths marked by the arrows A so that exterior air is drawn into the roof space an expelled through the vent 47.

A duct 87 is also provided through the fan housing from the exterior into the plenum 55. The duct 87 is located at a position spaced from the opening 47 and provides an inlet duct connecting with the exterior through the panel 43 and connected onto the suction side of the fan in the plenum 55. The duct 87 can be controlled by a flap valve 88 so as to allow air from the exterior into the plenum drawn by the reduced pressure of the suction side of the fan. The flap valve 88 is used separately from the flap valves 85 so that in a different mode of operation air is drawn into the greenhouse through the duct 87 to increase the pressure inside the greenhouse thus requiring excess air to be expelled through the roof vent 86.

These different modes of operation of the natural air ventilation system using exterior air can be used in different circumstances depending upon the temperature of the exterior air and the temperature within the greenhouse. The user can operate the system to provide optimum control of temperature for maximum consistency by selecting the mode, selecting the heating, cooling and humidification systems which are optimum in the circumstances as will be well known to one skilled in this art and to provide a required amount of fresh air from the exterior.

Figure 5:
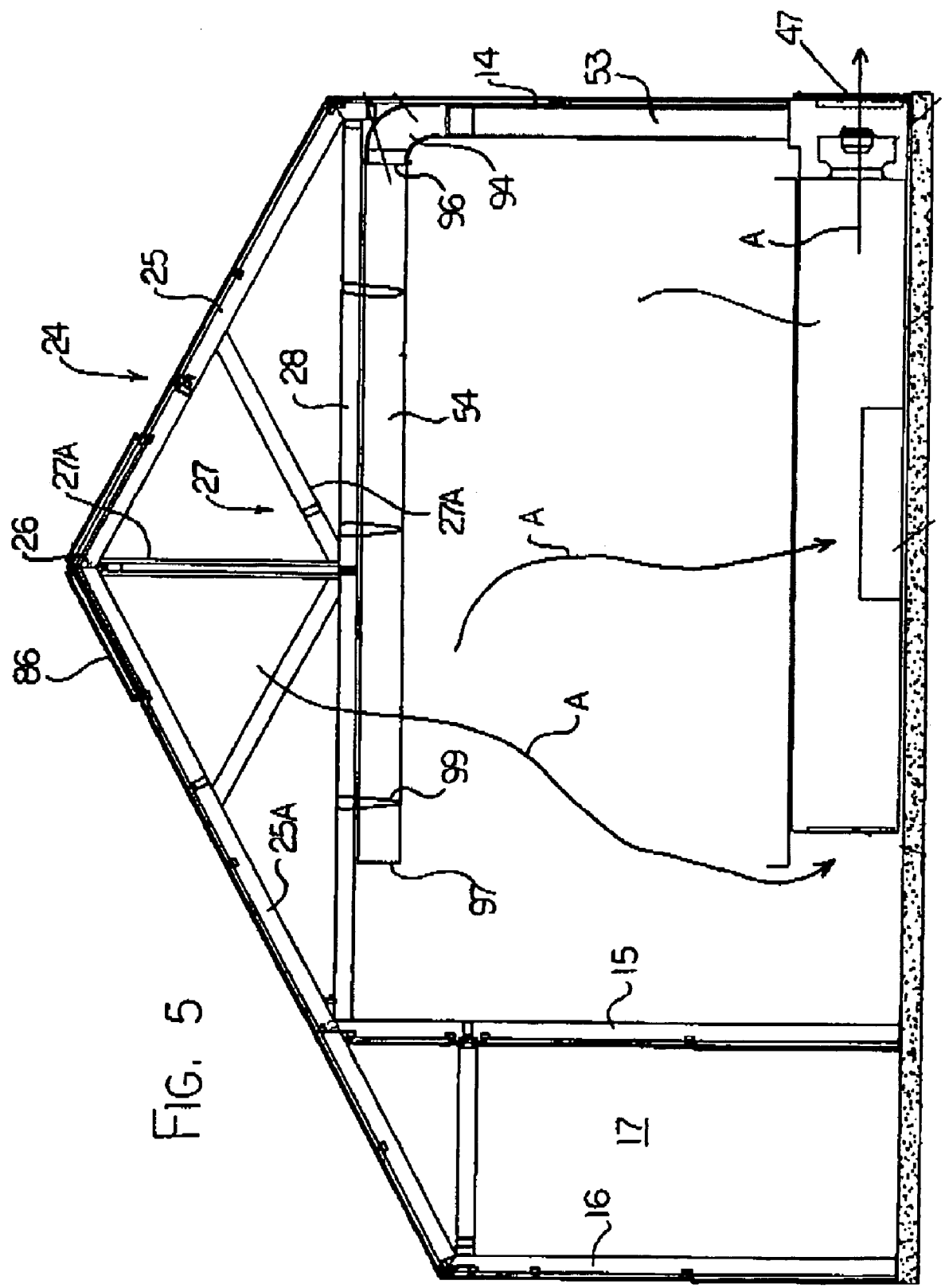
FIG. 5 is a transverse cross sectional view through whole structure of FIG. 1 showing arrangement of the posts and trusses and showing the roof venting openings for co-operation with the air handling systems.

The vertical duct section 53 is connected to the top wall 61 of the fan housing so as to receive pressurized air therefrom. The vertical duct 53 is arranged at the end wall 14 between the posts 21, 22 close to the panels. The vertical duct portion is formed from two parallel walls defining a front and rear wall which extend from the top surface 61 upwardly to a position closely adjacent the roof beams 28 as shown in FIG. 5. The vertical duct thus has a rectangular open bottom mouth defined by sidewalls 89 and 90 connecting the front wall 91 to the rear wall 92. The side walls 89 and 90 from their position connected with the top surface 61 of the fan housing converge inwardly to a neck section 93 and then diverge outwardly to an upper elbow 94. The elbow 94 has a horizontal bottom mouth 95 which is rectangular and connects to the top of the vertical duct portion. The elbow 94 forms a vertical mouth 96 at its upper end facing along the green house from the end wall 14 toward the opposite end wall 15 along the beams 28.

The elbow 94 and the vertical duct section 52 are formed from rigid transparent plastics material so as to be self supporting and fixed standing upwardly from the upper surface of the fan housing. These are transparent material allows the passage of light so as to reduce the interference with the natural light through the walls of the greenhouse.

The horizontal duct portion 54 is formed from a tubular body of flexible plastics material which is again transparent or translucent. The tubular body has a closed outer end 97 spaced outwardly from the open mouth 96 of the elbow 94. The opposite open end of the tubular body forming the duct portion 54 is engaged onto the end face 96 of the elbow 94 by horizontal top and bottom clamping bars 98 and semi-circular end pieces. Thus the flexible tubular body forming the duct portion 54 is held substantially elongate at its open mouth. The tubular body is suspended from the roof beams 28 on straps 99 so as to simply to extend along the roof beams 28 directly over the bench. The tubular body is inflated by the air from the vertical duct portion but is prevented from forming a circular cylindrical cross section by a plurality of vertical webs 100 which are arranged along the length of a tubular body at positions spaced across the width of the body and standing in a vertical plane. Thus the body when inflated forms generally an elliptical cross section with a wider bottom surface 101 than the height between the top and bottom surfaces which are defined by the webs 100. The bottom surface has an array of holes 102 which causes the air to escape from the underside of the tubular body and flow from the tubular body down toward the growing plants. The air flow is selected relative to the total areas of holes so that the air escapes from the tubular body under sufficient pressure to generate a velocity at the plants of the order of 50 ft/min which is known in the art to provide suitable gas exchange at the plant surfaces In the fan housing is also provided a water droplet injection nozzle or fogging system schematically indicated at 103 which includes a control valve 104 for controlling the injection of water droplets into the valve housing from a water supply through a chase 105 located in the chamber underneath the sill 42. The control system is shown schematically in FIG. 2 and comprises a controlled unit 106 which is arranged to control the supply of cooling fluid via cool control 107, to control the supply of heating fluid through a heating control 108, to control the position of the vents at the roof and in the fan housing through a vent motor control 109 and to control the supply of water droplets through a valve control 110. The control unit receives inputs from one or more sensors 111 which detect the temperature and humidity of the air at the plants.

The humidity of the air can also be carefully controlled either by de-humidifying the air or by adding water droplets at the nozzles 103. Dehumidifying the air is effected by sub-cooling the cooling coils 78 so that the cooling coil 78 is cooled to a lower temperature than the cooling coils 79. This acts to sub cool the air passing through the cooling coil 78 which extracts moisture from the air which is then suitably collected at the cooling coil and run to drain. Thus the cooling effect of the cooling coil 79 is relatively reduced in order to provide a reduction in temperature and the cooling coil 78 of the air which is lower than the resultant air temperature required thus acting to extract more moisture at the cooling coil 78 than would be obtained if all three cooling coils were run at the same cooling temperature. In extreme conditions of high humidity requiring a reduction in humidity for the interior of the greenhouse, it may be necessary to run the cooling coil 78 and at the same time to run the heating coil to reheat the air to the required temperature prior to pumping by the fan back to the horizontal discharge duct 54.

Humidification of the air is effected simply by the spraying of water droplets in a fogging system from the nozzle 103 within the fan housing. Water is supplied to the nozzles at a pressure of the order of 1000 PSI so as to form small droplets from the fogging system which are carried from the fan housing to the duct while evaporating in the air being transported through the duct for discharge into the greenhouse above the plants.

The use of the individual duct for each bench ensures that each bench is supplied with the same air in the same quantity and pattern since each of the air handling systems is managed symmetrically. The use of relatively flat wide discharge duct above the bench ensures that the air is deposited with little or no pressure downwardly over the full area of the bench so that each location on the bench receives substantially the same air movement from the duct. The duct is slightly narrower than the width of the bench but the location of holes around the hole whole of the underside of the duct 54 allows air to be expelled both directly downwardly and slightly to the sides of the duct.

Figure 8:
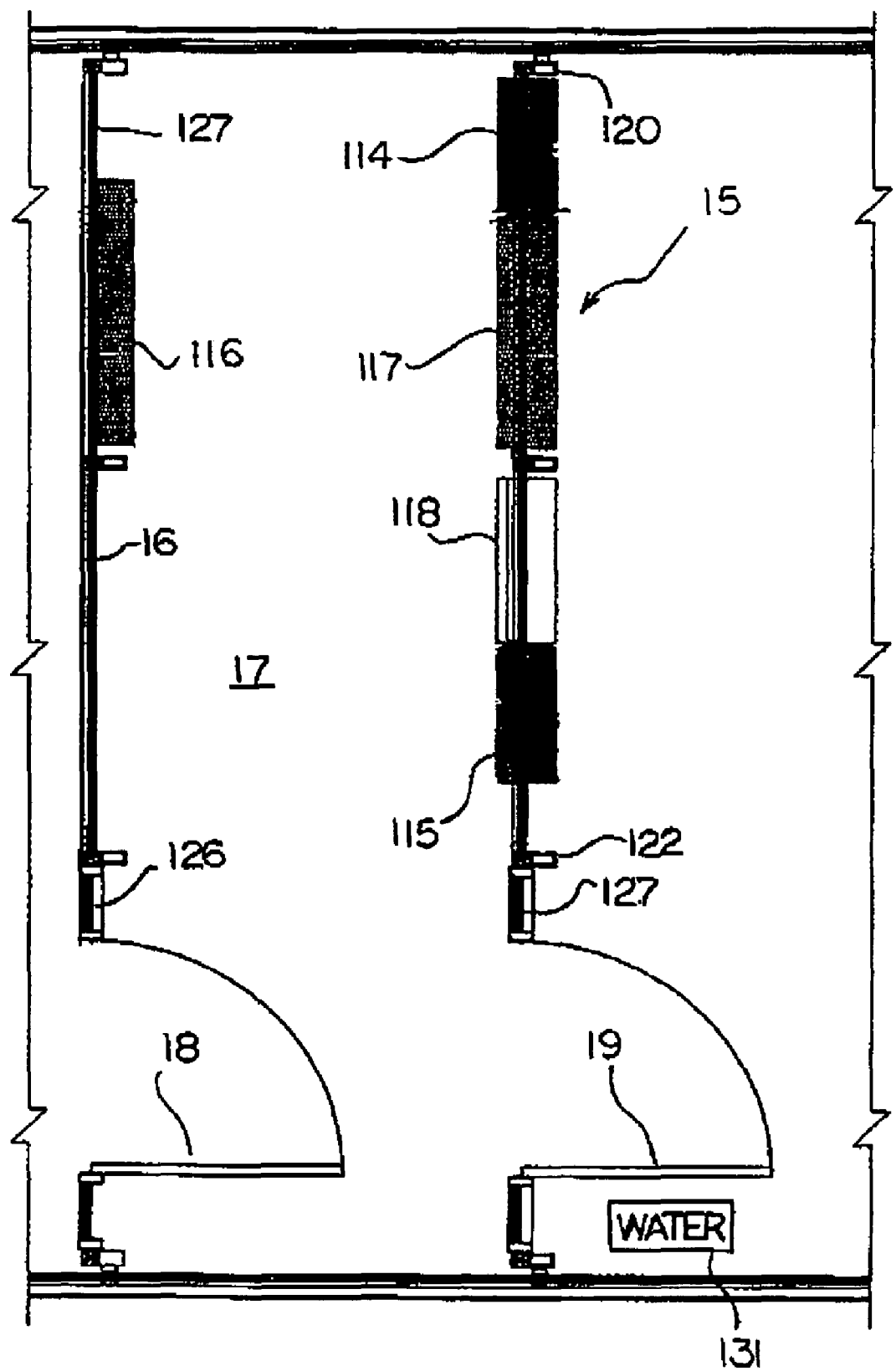
FIG. 8 is a plan view on an enlarged scale of the alley showing the plan view of the control cabinets forming the wall panels in the alley.
Figure 9:
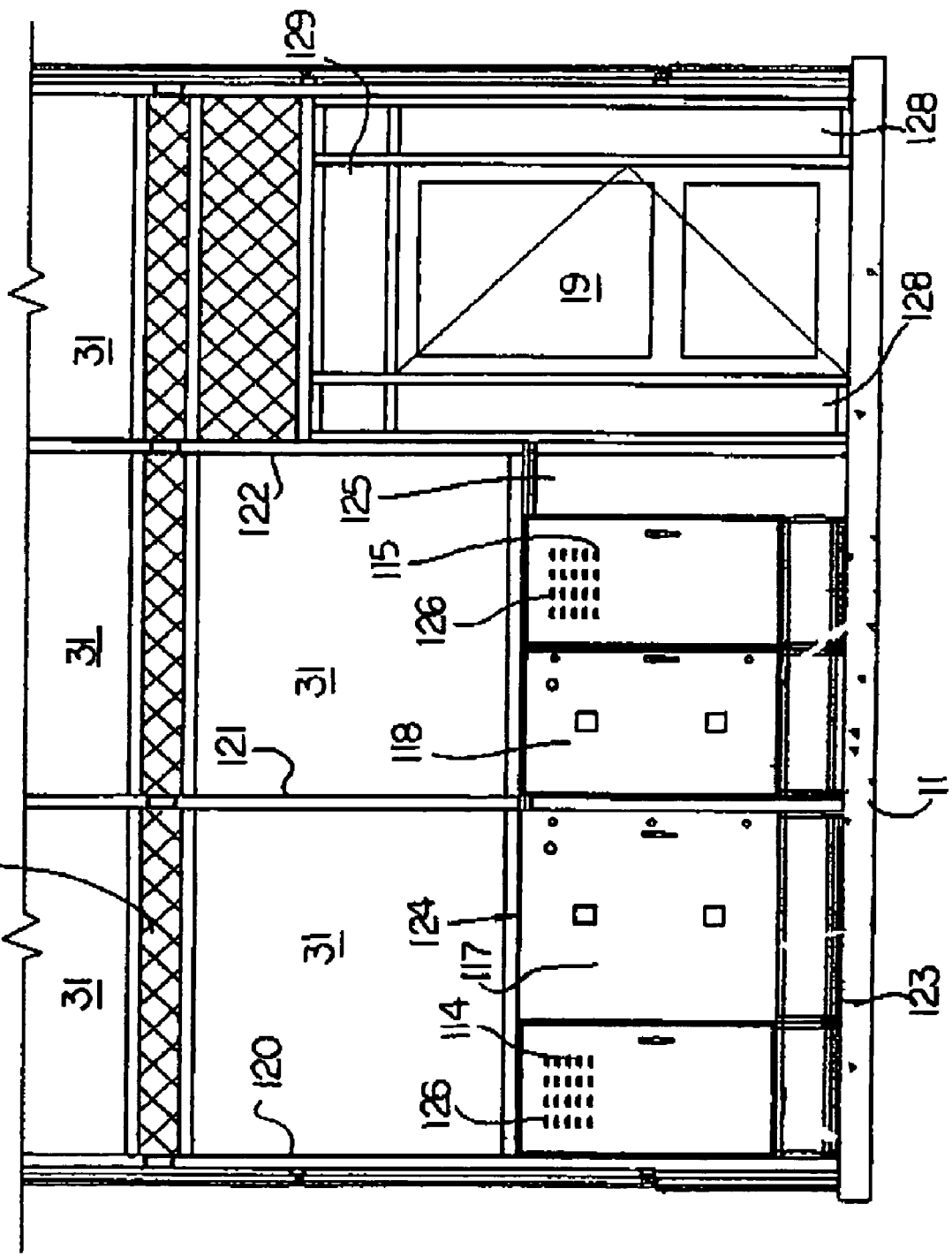
FIG. 9 is an elevational view of the components shown in FIG. 8 of the alley showing the elevational view of the control cabinets and door panel forming the panels in the alley.

The lighting system including the rows 23 of lighting elements comprises a plurality of individual light fixtures 112 mounted on a rail 113. These lighting fixtures includes a reflector and bulb but the ballast unit for the individual lighting fixtures are collected together in a cabinet 114 and 115. The control unit and the electrical connections and control elements necessary therefore are provided in plurality of cabinets 116, 117 and 118. These cabinets are conveniently located as shown in FIG. 8 in the alley 17.

As previously described the structure of the greenhouse is formed by panels which are inserted between posts where the panels are carried in the channels defined between the tube member and the cap. The cabinets are thus conveniently formed as panels which are arranged to be inserted in the alleyway between posts 120, 121 and 122 respectively. Thus the cabinet 114 and the cabinet 117 together form a panel with seals at the top and sides which allow the panels to co-operate with the channels of the posts 120 and 121 and the mullion piece 124 at the top of the panels. The bottom of the cabinets is raised from the floor and sits on a stand 123 at the bottom with a rear panel of the stand closing the area underneath the cabinet against communication if air between the alley and the greenhouse.

In a similar manner the cabinets 118 and 115 are mounted in a panel 125 which is located between the posts 121 and 122. Again the panels include top and side seals which engage the posts and mullion bar. The ballast cabinets 114 and 115 generate significant heat so they include inlet vents 126 for allowing fan generated air flow cooling.

Thus the pre-formed system of the greenhouse is maintained in that modular panels can be supplied for mounting in the location between the posts in the conventional manner previously described so that it is no longer necessary to manufacture or supply separate electrical cabinets and the location of those cabinets is conveniently provided for in the alley within the panels. Similarly the cabinet 116 is mounted in the panel 127 in the wall 16. Because the cabinet 116 is located in the exterior wall 16, it is mounted wholly within the structure so that the panel runs along the back of the cabinet 116. The cabinets 114, 117, 118 and 115 may be mounted as shown so that they project through the respective panel so as a portion of the cabinet is on each side of the panel. Each of the cabinets has a door or doors which is accessible from the alley 17.

The electrical cabinets contain the electrical components provided in the control system and all other electrical elements including a main power supply and a backup power supply in the event of an initial power failure.

In a similar manner, each of the doors 18 and 19 is formed as a panel 126, 127 so that it can be readily installed as part of the curtain wall system by mounting on the posts of the curtain wall system in the walls 16 and 15 respectively. Thus the panels 126 and 127 include side panel portions 128 and a top panel portion 129 which surround the door and form the panel into a predetermined dimension matching the width between the posts and matching a required spaced between the floor and a mullion bar. The remaining spaces between the posts can be formed by transparent panels 31 as previously described or by insulated non transparent filler panels 130.

In FIG. 8 is shown one possible location of the water pump system 131 for supplying water under pressure of the order of 1000 PSI for supplying the water nozzles for the humidification system. Additional water nozzles (not shown) can also be provided in the area underneath the horizontal discharge ducts 54 for increased humidification levels and/or in the area of the roof vents so as to provide water evaporative cooling of the air. The control system 110 previously described controls the supply of water from the pump system 131 to the individual nozzles so as to provide the required effect either within the fan housing or within the other areas of the greenhouse as is required and is known to persons skilled in the art.

Figure 10:
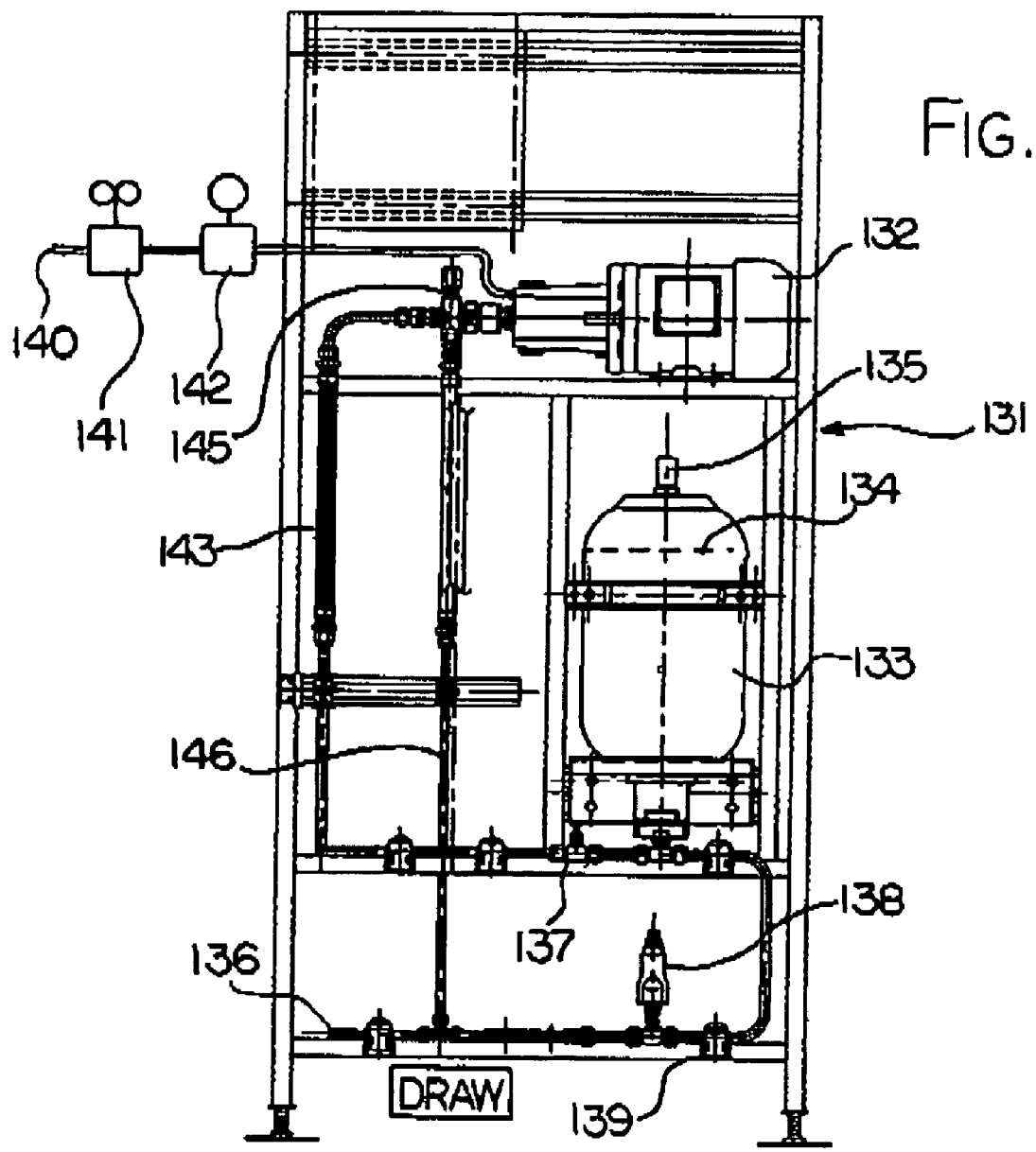
FIG. 10 is a schematic layout of the pressurized water supply system for the fogging nozzles in the air handling duct of FIG. 1 showing the arrangement of pump and accumulator.

Turning now to FIG. 10, the pump system 131 is shown in more detail which comprises a pump 132 and an accumulator 133. The accumulator 133 includes a bladder 134 with nitrogen contained within the bladder injected from a pressure nozzle 135. The accumulator tank 133 is designed to receive and contain the water under the high pressure of the order of 1000 PSI for supplying the injection nozzles. The outlet to the nozzles is indicated at 136. Water supplied to the pump 132 at an inlet line 140 is controlled by a valve 141 and a pressure sensor 142 and is pumped to the pressure of the order of 1000 PSI which is pumped into the accumulator through a line 143 controlled by valves 137 until the pressure within the accumulator as detected by a pressure valve 138 reaches the required maximum operating pressure at which time the pump is shut off. Water under pressure is then supplied from the accumulator under the control of the valve arrangements 139 to the nozzles as required. The outlet pressure is maintained above a predetermined minimum as detected by a pressure detector 138 and when the minimum is reached the pump is reactivated to pump more water into the accumulator. An over pressure valve 145 can detect running of the pump beyond a required pressure and switches the output of the pump to a drain line 146.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A climate control system for use in a greenhouse having an exterior wall structure which includes primarily transparent panels allowing entry to an interior of natural light, the system being arranged for conditioning the air within the interior and comprising:
    a plurality of benches arranged to be located within the interior and provide support surfaces for supporting crop materials thereon for receiving the natural light and growing within the interior; and
    a plurality of air handling systems each associated with a respective one of the plurality of benches and each comprising:
        an air intake plenum having at least one air intake,
        a fan connected to the air intake plenum,
        an outlet duct connected to the fan having an air outlet for expelling air from the outlet duct into the interior of the greenhouse,
        and at least one air conditioning component for conditioning the air transported from the air intake plenum to the outlet duct by the fan;
    the air intake plenum of each of the plurality of air handling systems including at least a part thereof mounted underneath the respective one of the plurality of benches and comprising a generally rectangular structure defined by upstanding side walls and having a bottom portion for contacting a floor and a top portion providing support for the respective bench so as to transfer weight from the bench to the floor.

2. The system according to claim 1 wherein the bench is slidable side to side across the air intake plenum.

3. The system according to claim 1 wherein the bench is tiltable about a horizontal axis longitudinally along the air intake plenum.

4. The system according to claim 1 wherein the outlet duct includes a vertical duct section at one end of the respective one of the plurality of benches.

5. The system according to claim 4 wherein the outlet duct includes a horizontal discharge duct section connected to the vertical duct section and extending over and along the respective one of the plurality of benches for discharging the air therefrom downwardly onto the respective one of the plurality of benches.

6. The system according to claim 5 wherein the horizontal duct section comprises a flexible tube shaped to form an elliptical cross section which is wider than it is high.

7. The system according to claim 1 wherein the air intake plenum underneath the respective one of the plurality of benches contains at least one heating coil for heating the air.

8. The system according to claim 1 wherein the air intake plenum underneath the respective one of the plurality of benches contains at least one cooling coil for cooling the air.

9. The system according to claim 8 wherein said at least one air intake of the air intake plenum underneath the respective one of the plurality of benches includes a plurality of air intakes and wherein there is provided a respective one of a plurality of cooling coils at each of the plurality of air intakes.

10. The system according to claim 9 wherein supply of cooling fluid to each of the plurality of cooling coils is controlled by a cooling system which is arranged to effect sub-cooling at one of the plurality of cooling coils for de-humidifying the air.

11. The system according to claim 1 wherein the fan is located in a fan housing at one end of the respective one of the plurality of benches.

12. The system according to claim 1 wherein there is provided an air flow connection which is arranged to communicate with one sidewall of the exterior wall structure at one end of the respective one of the plurality of benches.

13. The system according to claim 1 wherein said at least one air intake of the air intake plenum includes one air intake at each side and one air intake at an end.

14. The system according to claim 1 wherein the air intake plenum underneath the respective one of the plurality of benches contains fogging nozzles for applying water droplets to the air.

15. The system according to claim 14 wherein the fogging nozzles are supplied with water under pressure from a fogging water supply system including a water pump operable to supply water under pressure to an accumulator tank having a gas membrane, the tank being arranged to supply the water under pressure to the nozzles and including a pressure control valve arranged to operate the pump to maintain the pressure within the tank between upper and lower pressure limits so as operate the pump only when the lower pressure limit is reached.

16. A climate control system for use in a greenhouse having an exterior wall structure which includes primarily transparent panels allowing entry to an interior of natural light, the system being arranged for conditioning the air within the interior and comprising:
 a plurality of benches each arranged to be located within the interior and provide support surfaces for supporting crop materials thereon for receiving the natural light and growing within the interior; and
 a plurality of air handling systems each associated with a respective one of the plurality of benches;
 each of the plurality of air handling systems comprising:
  a respective duct associated with the respective air handling system;
  a respective air intake plenum separate from the air intake plenums of others of the plurality of air handling systems;
  the respective air intake plenum having at least one air intake separate from the air intakes of others of the plurality of air handling systems;
  a respective fan separate from the fans of others of the plurality of air handling systems connected to the air intake plenum;
  a respective outlet duct separate from the outlet ducts of others of the plurality of air handling systems connected to the respective fan,
  the respective outlet duct having a respective air outlet separate from the air outlets of others of the plurality of air handling systems for expelling air from the respective outlet duct into the interior of the greenhouse;
  a respective connection separate from the connections of others of the air handling systems to communicate with exterior air at one sidewall of the exterior wall structure;
  and at least one respective air conditioning component separate from the air conditioning components of others of the air handling systems for conditioning the air transported from the air intake plenum to the outlet duct by the fan;
  each of the respective air intake plenum, the respective fan, the respective connection, the respective outlet duct and the respective air conditioning component being connected to the respective duct for communication of air therebetween through the respective duct;
 wherein said at least one air intake of each air intake plenum includes at least two air intakes and wherein there is provided a cooling coil at each of the two air intakes;
 and wherein supply of cooling fluid to each of the cooling coils is controlled by a cooling system which is arranged to effect sub-cooling at one of the cooling coils for de-humidifying the air.

17. The system according to claim 16 wherein the respective outlet duct of each of the plurality of air handling systems includes a respective vertical duct section separate from the vertical duct sections of others of the air handling systems at one end of the respective bench of the plurality of benches.

18. The system according to claim 17 wherein the respective outlet duct of each of the plurality of air handling systems includes a respective horizontal discharge duct section separate from the horizontal discharge duct sections of others of the plurality of air handling systems connected to the respective vertical duct section and extending over and along the respective bench of the plurality of benches for discharging air downwardly onto the respective bench of the plurality of benches.

19. The system according to claim 18 wherein the horizontal duct section comprises a flexible tube shaped to form an elliptical cross section which is wider than it is high.

20. The system according to claim 16 wherein the respective air intake plenum of each of the plurality of air handling systems contains at least one heating coil for heating the air.

21. The system according to claim 16 wherein the respective air intake plenum of each of the plurality of air handling systems contains at least one cooling coil for cooling the air.

22. The system according to claim 16 wherein the respective fan of each air handling system of the plurality of air handling systems is located in a respective housing at one end of the respective bench of the plurality of benches.

23. The system according to claim 16 wherein the respective fan is mounted in a respective fan housing with the respective fan housing at one end of the respective bench of the plurality of benches arranged to be located at one exterior wall of the greenhouse and wherein the respective fan housing has a respective connection for exterior air arranged to extend through said one exterior wall.

24. The system according to claim 16 wherein each bench of the plurality of benches has at least a part of the respective air intake plenum mounted underneath the respective bench of the plurality of benches as at least a part of the support therefore, the respective air intake plenum comprising a generally rectangular structure defined by upstanding side walls and having a bottom portion contacting a floor and a top portion providing support for the respective bench so as to transfer weight from the bench to the floor.

25. The system according to claim 24 wherein the respective bench is slidable side to side across the respective intake plenum.

26. The system according to claim 24 wherein the respective bench is tiltable about a horizontal axis longitudinally along the respective intake plenum.

27. The system according to claim 16 wherein the outlet duct includes a respective vertical duct section separate from the vertical duct sections of others of the plurality of air handling systems; at one end of the respective bench of the plurality of benches.

28. The system according to claim 27 wherein the respective outlet duct includes a horizontal discharge duct section separate from the horizontal discharge duct sections of others of the plurality of air handling systems connected to the respective vertical duct section and extending over the respective bench of the plurality of benches for discharging air downwardly onto the respective bench of the plurality of benches.

29. A climate control system for use in a greenhouse having an exterior wall structure which includes primarily transparent panels allowing entry to an interior of natural light, the system being arranged for conditioning the air within the interior and comprising:
   a plurality of benches each arranged to be located within the interior and provide support surfaces for supporting crop materials thereon for receiving the natural light and growing within the interior;
   a plurality of air handling systems each associated with a respective one of the plurality of benches;
   each one of the plurality of air handling systems comprising:
      an air intake plenum having at least one air intake separate from the air intake plenums of others of the plurality of air handling systems,
      an outlet duct having at least one air outlet for expelling air from the outlet duct into the interior of the greenhouse separate from the air outlets of others of the plurality of air handling systems,
      a fan connected to the plenum and the outlet duct and arranged to transfer air from the plenum to the outlet duct separate from the fans of others of the plurality of air handling systems;
      and at least one air conditioning component for conditioning the air transported from the air intake plenum to the outlet duct by the fan separate from the air conditioning components of others of the plurality of air handling systems;
   the air intake plenum including at least a part thereof mounted underneath the respective bench with the at least one air intake thereof located so as to draw air into the plenum from underneath the respective bench;
   and the outlet duct including at least a part thereof above the respective bench with the at least one air outlet thereof arranged for discharge of the conditioned air at a position above the respective bench to as to travel downwardly onto the respective bench.

30. The system according to claim 29 wherein the part of the air intake plenum under the bench defines a rectangular housing arranged for supporting a horizontal bench top.

31. The system according to claim 30 wherein the horizontal bench top is slidable side to side across the housing.

32. The system according to claim 30 wherein the horizontal bench top is tiltable about a horizontal axis longitudinally along the housing.

33. The system according to claim 29 wherein the outlet duct includes a vertical duct section at one end of the bench.

34. The system according to claim 33 wherein the outlet duct includes a horizontal discharge duct section connected to the vertical duct section and extending over and along the bench with the at least one air outlet thereof arranged on an underside thereof for discharging the air therefrom downwardly onto the bench.

35. The system according to claim 34 wherein the at least one air outlet comprises a plurality of perforations in the underside of the horizontal duct section.

36. The system according to claim 34 wherein the horizontal duct section comprises a flexible tube shaped to form an elliptical cross section which is wider than it is high.

37. The system according to claim 29 wherein there is provided an air flow connection which is arranged to communicate with one sidewall of the exterior wall structure at one end of the bench.

* * * * *